United States Patent [19]

Servais et al.

[11] Patent Number: 5,240,776
[45] Date of Patent: Aug. 31, 1993

[54] CORROSION RESISTANT REFLECTIVE ARTICLES

[75] Inventors: Albert Servais; Christian Dauby, both of Gerpinnes; Bernard Somerhausen, Nivelles, all of Belgium

[73] Assignee: Glaverbel, Brussels, Belgium

[21] Appl. No.: 786,825

[22] Filed: Nov. 1, 1991

[30] Foreign Application Priority Data

Nov. 3, 1990 [GB] United Kingdom ................ 9023949
Apr. 16, 1991 [GB] United Kingdom ................ 9108009

[51] Int. Cl.$^5$ ........................ B32B 17/06; B32B 15/04
[52] U.S. Cl. .................................... 428/434; 428/457; 428/912.2
[58] Field of Search ............ 428/457, 434, 432, 912.2, 428/630; 359/838

[56] References Cited

U.S. PATENT DOCUMENTS 4,894,278 1/1990 Servais et al. ................. 427/266 X
4,981,720 1/1991 Servais ............................. 427/427
5,050,978 9/1991 Servais ............................. 359/838

FOREIGN PATENT DOCUMENTS 865,709 2/1940 France
2,200,218 8/1990 Japan
2,068,415 8/1981 United Kingdom
2,206,129 12/1988 United Kingdom Primary Examiner—Thomas J. Herbert, Jr.
Attorney, Agent, or Firm—Spencer, Frank & Schneider

[57] ABSTRACT

A reflective article includes a glass substrate and a reflective metal coating deposited on the glass substrate including a reflective layer of silver and having a surface stratum which has a population of tin atoms which is augmented as compared with the population of tin atoms (if any) in an underlying subsurface stratum by at least one tin atom per hundred metal atoms thereby conferring on the reflective metal coating an enhanced resistance to corrosion. The reflective layer of silver is treated with an acidified aqueous solution of a stannous salt, which solution is free from opalescence, thereby to augment tin atom population in a surface stratum of the reflective metal coating.

13 Claims, No Drawings

CORROSION RESISTANT REFLECTIVE ARTICLES

BACKGROUND OF THE INVENTION

1. Field of the Invention

This invention relates to reflective articles comprising a reflective metal coating deposited on a glass substrate, and it extends to methods of manufacturing such articles.

The present invention results from research which was conducted with the principal aim of conserving the optical properties of glass bearing reflective coatings containing silver by protecting such coatings against atmospheric corrosion.

A reflective metal coating may be deposited pattern-wise to form a decorative article, but the invention has particular reference to glass substrates bearing a continuous reflective coating. The reflective coating may be so thin that it is transparent. Glass panes bearing transparent reflective coatings are useful inter alia as solar screening panels or as low-emissivity (in respect of infra-red radiation) panels. Alternatively, the coating may be fully reflective, thus forming a mirrorcoating. Such a mirror may be plane, or it may be curved.

2. Description of the Related Art

Reflective metal coatings, e.g. of silver, are apt to be attacked by atmospheric pollution with the result that the silver layer becomes tarnished so that the required optical properties of that layer are lost. It is accordingly known to apply protective layers to such a silver layer, the nature of the protective layer being determined by the required properties of the coated substrate and by cost.

For example, transparent silver layers such as may be used in solar screening coatings may be protected against corrosion by overcoating them with one or more transparent metal oxide layers. Such silver layers are often formed by a vacuum deposition technique, and the protective layer(s) is or are also formed by vacuum deposition, often in the same apparatus, to avoid risk of marring the silver layer. Such protective layers are expensive to form.

Front-silvered mirrors may be protected in the same way.

Back-silvered mirrors may be protected by one or more opaque layers, since the optical properties of the rear face of a mirror are largely irrelevant, and that face is anyway usually hidden from view in some form of mirror mounting.

According to classical methods, mirrors are manufactured by sensitizing a glass sheet, applying a silvering solution to form a silver reflective layer, overcoating that silver layer with a protective layer of copper, and then painting the copper layer to produce the finished mirror.

The purpose of the copper layer is to retard tarnishing of the silver layer, and the copper layer is itself protected from abrasion and corrosion by the layer of paint.

Of the various paint formulations which could be used for protecting a mirror, those which afford the best protection against corrosion of the copper layer contain lead pigments. Unfortunately lead pigments are toxic and their use is being increasingly discouraged for reasons of environmental health.

SUMMARY OF THE INVENTION

The present invention results from research into the problem of finding another simple and effective way of protecting a silver coating against corrosion.

According to this invention, there is provided a reflective article comprising a reflective metal coating deposited on a glass substrate, characterized in that said metal coating comprises a reflective layer of silver and has a surface stratum having a population of tin atoms which is augmented as compared with the population of tin atoms (if any) in an underlying subsurface stratum by at least one tin atom per hundred metal atoms thereby conferring on such metal coating an enhanced resistance to corrosion.

In a second aspect, the invention includes a reflective article comprising a reflective metal coating deposited on a glass substrate, characterized in that said metal coating comprises a reflective layer of silver and has been treated with an acidified aqueous solution of a stannous salt, which solution is free from opalescence, thereby to augment the population of tin atoms in a surface stratum of said metal layer.

The invention extends to a method of manufacturing a reflective article comprising a reflective metal coating deposited on a glass substrate, characterized in that such method comprises the following steps: forming a metal coating comprising a reflective layer of silver on a surface of the substrate, contacting the metal coating with a freshly-made acidifed aqueous treatment solution of a stannous salt to augment the population of tin atoms in a surface stratum of said metal layer, such solution being free from opalescene, and washing and drying the thus treated metal coating.

It is found that the silver of an article according to the invention is afforded a measure of protection against corrosion by treatment with an acidified aqueous solution of a stannous salt. We believe that this is due to the incorporation of a population of tin atoms in a surface stratum of the metal of the article. The precise reason why this should have a beneficial effect in retarding corrosion of silver by the atmosphere is not fully understood. We have, however, found that it is essential to use a fresh solution of a stannous salt if the benefit of the invention is to be realised. When a solution of a tin salt has been made up, it is observed that after a time, certainly within 48 hours at ambient temperature, certain reactions take place within the solution rendering the solution slightly opalescent. Once a solution of a stannous salt has turned opalescent or turbid its use will not afford the surprising benefits achieved by this invention.

We have found that in an article according to the invention there is a distinct surface stratum of the metal layer which contains a population of tin atoms, and it is considered that the enhanced corrosion resistance is afforded by the presence of tin atoms in this surface stratum: but for the corrosion resistance to be enhanced it is necessary that those tin atoms should have originated from a solution of a stannous rather than a stannic salt. This will be demonstrated by a comparative example later in this specification.

In reflective articles according to the second aspect of this invention, it is advantageous that such coating layer has a surface stratum having a population of tin atoms which is augmented as compared with the population of tin atoms (if any) in an underlying subsurface stratum by at least one tin atom per hundred metal atoms.

Preferably, said surface stratum has a said population of tin atoms which is augmented as compared with the population of tin atoms (if any) in an underlying subsurface stratum by at least five tin atoms per hundred metal atoms, since this is found to give a very good protection against corrosion.

Solutions of tin (II) salts may be used simply and economically. Contacting the coating with as little as 1 mg/m$^2$ in solution is quite sufficient to afford some degree of protection, and it is considered that the application of quantities greater than 1500 mg/m$^2$ affords no commensurate increase in corrosion resistance. Indeed, using greater quantities may have a deleterious effect in decreasing adherence between the reflective coating and any layer of paint which may subsequently be applied.

We have found that for the best results, said treatment solution is applied to the coated substrate in such an amount that tin (II) atoms are applied to the coating in an amount between 10 mg and 1000 mg per square meter of coating.

Such an article may be protected against abrasion in any suitable way. For example, front-silvered curved mirrors forming parts of a catadioptric lens system will be protected against abrasion by other lens components. In such a case, the principal advantage of the invention may lie in protecting the mirror against tarnishing during the interval between its manufacture and its incorporation into the lens, though the treatment of the invention will also be valuable where the lens system is not hermetically sealed, or in case any such seal fails.

In the manufacture of an article according to this invention embodied as a back-silvered mirror, the presence of a copper layer on top of the reflective silver layer is not essential, as it is in classical mirror manufacturing methods, and in some preferred embodiments of the invention, said metal coating is constituted by a said reflective layer of silver. This has the advantage of economy in that the classical coppering step is eliminated, thereby saving on materials and manufacturing time. It is extremely surprising that contacting a silver layer with a treatment solution in accordance with this invention and then painting it can protect the silver layer against corrosion and abrasion as well as a classical copper layer which is then painted with a paint containing a lead-based pigment.

In other preferred embodiments of the invention, said metal coating is constituted by a said reflective layer of silver and a thin overcoating film of copper. Such film may contain copper in an amount of the order of 300 mg/m$^2$. The presence of such a thin copper layer has been found to give improved results when the reflective article is subjected to certain accelerated ageing tests designed to give an indication of resistance to attack by acids. This is extremely surprising, because we have also found that the presence of a rather thicker copper layer, for example a layer containing copper in an amount of 600 mg/m$^2$, tends to render the protective treatment of this invention ineffective or at least unpredictable. Of course, such embodiments are not so economically advantageous as those in which no copper film is formed, but as has been stated, the presence of a thin copper layer gives surprising results in terms of resistance to certain accelerated ageing tests.

In some preferred embodiments of the invention, the silver is in the form of a transparent coating applied to a glass sheet which is held in spaced relation from at least one other glass sheet to form a hollow glazing unit, the silver coating being located inside the glazing unit. In such embodiments, the silver coating is protected against abrasion by its enclosure within the hollow glazing unit, and the treatment of the invention serves to protect that coating against corrosion before its incorporation into the glazing unit and in the event of any failure of the hermetic sealing (if any) of that unit. Such units are useful for reducing the emission of infra-red radiation and/or for solar screening purposes.

In other preferred embodiments of the invention, silver is applied to a glass sheet as an opaque coating so that the article is constituted as a mirror. Embodiments of the invention wherein the said article is constituted as a mirror are useful for many purposes, for example as ordinary plane domestic mirrors, or as rear view mirrors for motor vehicles.

In preferred embodiments of the invention useful as back-silvered mirrors, the metal coating is overcoated with at least one protective layer of paint. In such embodiments, the metal coating is afforded a measure of protection against corrosion by the treatment which characterizes the invention, and against abrasion by the paint.

Advantageously, a said paint layer has been applied to a said metal coating after the latter has been treated with a silane. Contacting said metal coating with a silane before painting can promote adhesion of the paint to the treated metal coating, so promoting resistance of the reflective article to abrasion and corrosion.

Preferably, for health reasons, the paint is substantially lead-free.

In some preferred embodiments of the invention, especially those in which the reflective metal coating is transparent, said metal coating is applied by vacuum deposition. This is admittedly a rather expensive way of forming such a coating, but it has the advantage of allowing very fine control over the thickness, and uniformity of thickness, of that coating, and it also allows the formation of high quality transparent coatings and of very thin coatings, for example coatings having a thickness in the range 8 nm to 30 nm which have very good properties for use as solar screening and/or low emissivity coatings.

It is particularly surprising that good protection can be afforded to a silver layer which has been formed by a vacuum deposition technique by treating it with an aqueous solution in accordance with the invention. We have found that such layers are generally hydrophobic in nature and it would be expected that it would not be possible, or that it would at least be very difficult, to achieve a uniform and effective treatment of such a silver layer in an economical manner.

In embodiments of the invention in which a said reflective metal coating is not transparent, it is preferred that such metal coating is deposited onto a sensitized surface of the substrate using at least one metallizing solution. Deposition of the metal coating from a metallizing solution is very much less expensive than by other techniques such as vacuum deposition.

The protective treatment should be applied to the metal coating as soon as possible after deposition in order to achieve the maximum benefit. In the case of a metal coating deposited from one or more metallizing solutions, the treatment may be applied to a warm and dry layer of metal, that is to say to a layer of metal after that layer has been formed, rinsed and then dried, for example at about 60° C., or it may be applied to a wet layer of metal at ambient temperature, that is, directly after rinsing of the freshly formed metal coating. The results obtained are equivalent, but for reasons of speed and manufacturing cost it is preferred that the freshly formed metal coating is rinsed and then contacted with a said treatment solution while still wet.

In some such preferred embodiments of the invention the solution used for treating the metal coating contains ingredients of the same composition as those used in the solution used for sensitizing the glass before formation of that coating. The adoption of this preferred feature has the advantage of eliminating the need to obtain and store different ingredients for making the treatment and sensitizing solutions. We have found to our surprise that a treatment solution containing the same ingredients as such a sensitizing solution gives excellent results in protecting the reflective coating against corrosion.

In some embodiments of the invention, the treatment solution is an aqueous solution of a bromide, iodide or acetate, but advantageously, the or a treatment solution is selected from aqueous solutions of one of: $SnCl_2$ and $SnSO_4$. Such solutions are particularly effective for affording sufficient protection to silver or silvered articles and to reflective metal coatings, especially when they are later overcoated with paint. The most preferred treatment material is $SnCl_2$. If desired, the treatment solution may contain an adjuvant such as beta-naphthol which has the effect of increasing the stability of the tin(II) ions in the solutions.

The use of a tin salt, especially $SnCl_2$, has a further advantage in the case that the reflective layer is deposited using one or more metallizing solutions. The glass substrate requires sensitization prior to the formation of the silver layer formed in that way, and in classical mirror manufacture, such sensitization is most often performed by contacting the glass with a sensitizing solution of stannous chloride. It is surprising that the same salt can be used both for sensitizing the glass and for protecting a said silver layer.

The treatment solution may be a solution of which the solute consists solely of a stannous salt, or the treatment solution may contain a stannous salt together with a salt of another metal. In some preferred embodiments of the invention, said treatment solution additionally contains ions of titanium. Following the use of such a treatment solution, a treated article will have a surface stratum which, in addition to containing a population of tin atoms, also contains a population of titanium atoms. This also gives very good results in terms of protection against corrosion.

We have found that the efficacy of the treatment of the invention is promoted when, as preferred, said treatment solution has a pH which is not greater than 4. Acidification of the treatment solution is suitably carried out by adding the acid corresponding to the tin salt used.

Preferred embodiments of the invention will now be described by way of example only.

DESCRIPTION OF THE PREFERRED EMBODIMENTS

EXAMPLE 1

Mirrors according to the invention are manufactured on a classical mirror production line. Sheets of glass are polished and sensitized using a solution of stannous chloride in the usual way. The sheets are then sprayed with a classical silvering solution containing a silver salt and a reducing agent, the spraying rate being such as to form on each glass sheet a layer containing silver in an amount of about 1000 mg/m². The silvered glass is then rinsed and dried at about 60° C. The glass is then oriented vertically, and an acidified aqueous solution containing about 120 mg stannous chloride per liter is poured over it. The stannous chloride solution is used while freshly prepared and it is free from opalescence. Hydrochloric acid is added to the solution to bring its pH to between 1 and 3.5. After such treatment, the glass is rinsed, dried and then painted using an epoxy paint from Levis. The painting includes a first layer about 25 micrometers thick of alkyd-epoxy, with a second coat of epoxy about 30 micrometers thick.

Mirrors manufactured in this way have been subjected to different accelerated ageing tests.

One indication of the resistance to ageing of a mirror incorporating a metallic film can be given by subjecting it to a copper-accelerated acetic acid salt spray test known as the CASS Test in which the mirror is placed in a testing chamber at 50° C. and is subjected to the action of a fog formed by spraying an aqueous solution containing 50 g/L sodium chloride, 0.2 g/L anhydrous cuprous chloride with sufficient glacial acetic acid to bring the pH of the sprayed solution to between 3.0 and 3.1. Full details of this test are set out in International Standard ISO 3770-1976. Mirrors may be subjected to the action of the saline fog for different lengths of time, whereafter the reflective properties of the artificially aged mirror may be compared with the reflective properties of the freshly formed mirror. We find that an exposure time of 120 hours gives a useful indication of the resistance of a mirror to ageing. We perform the CASS Test on 10 cm square mirror tiles, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean of these ten measurements is calculated. One can also measure the maximum corrosion present at the margin of the tile to obtain a result which is again measured in micrometers.

A second indication of the resistance to ageing of a mirror incorporating a metallic film can be given by subjecting it to a Salt Fog Test which consists in subjecting the mirror to the action, in a chamber maintained at 35° C., of a salt fog formed by spraying an aqueous solution containing 50 g/L sodium chloride. We find that an exposure time of 480 hours to the Salt Fog Test gives a useful indication of the resistance of a mirror to ageing. The mirror is again subjected to microscopic examination, and the corrosion present at the margin of the tile is measured to obtain a result in micrometers, in the same way as in the CASS Test.

10 cm square mirror tiles manufactured in accordance with Example 1 were tested by both the above tests, together with Test Samples not according to the invention.

Test Sample 1 was manufactured as specified in Example 1 save that the silver layer was painted directly after the freshly formed silver layer had been rinsed and dried. The stannous chloride treatment of that silver layer was omitted. The silver and paint layers were applied as described in Example 1.

Test Sample 2 was also manufactured as specified in Example 1 save that the stannous chloride treatment of that silver layer was omitted, and a coppering solution of traditional composition was sprayed onto the silver layer to form a layer containing copper in an amount of 300 mg/m² prior to rinsing and drying and then painting. The silver and paint layers were applied as described in Example 1.

The results of the two ageing test on the mirror of Example 1 and the two Test samples were as follows.

| Mirror | CASS test mean in μm | Salt fog test mean in μm |
| --- | --- | --- |
| Example 1 | 99 | 58 |
| Test sample 1 | 4250 | 3906 |
| Test sample 2 | 134 | 51 |

The stannous chloride treatment of the silver layer of the mirror of Example 1 thus considerably diminishes the mirror edge corrosion as compared with a mirror having a silver layer which is only protected by paint (Test Sample 1). The stannous chloride treatment affords much the same protection to the silver layer as does a classical copper protective layer (Test Sample 2).

Mirrors according to Example 1 were also tested for their resistance to attack by a fixing adhesive of the oxime-linked silicone type. The resistance of a mirror to such an adhesive is estimated by bonding the coated face of the mirror to a sheet of glass. The assembly is left to polymerise for fifteen days at ambient temperature and humidity and is then subjected to a fog test in which the assembly is placed in a chamber at 50° C. and subjected to the action of a fog formed by spraying demineralized water for a period of 480 hours. This has substantially no effect on a mirror produced in accordance with Example 1. On the other hand, a mirror in accordance with Test Sample 2 becomes clouded after being subjected to that test.

EXAMPLE 2

Sheets of soda-lime glass measuring 3.2 by 1.8 meters are advanced at a speed of 9.3 meters per minute along a classical mirror production line, where the glass is polished and sensitized in the usual way. The sheets of glass then pass through a silvering station where they are sprayed with a classical aqueous silvering solution to form a layer containing silver in an amount of approximately 1000 mg/m².

Directly after rinsing of the silver layer, at ambient temperature, the advancing silvered sheets of glass are sprayed with an acidified, aqueous, precipitate-free and non-opalescent solution of stannous chloride. In a particular practical embodiment, a fresh solution containing 12 g/L SnCl₂ is fed at a rate of 118 mL per minute to a metering pump where that solution is diluted with demineralized water and fed to a bank of fourteen spray heads each of which delivers 310 mL/min of the diluted solution against the glass. After rinsing and drying, the mirrors are painted in two coats to a total thickness of about 50 μm. The paints used, both from Merckens, were an alkyde-acrylic for the first coat and an alkyde for the second coat.

The results obtained when the mirrors were subjected to accelerated ageing tests were similar to those given by the mirror of Example 1.

Good accelerated ageing test results were also given when the stannous chloride treatment solution contained as much as 83 g/L SnCl₂.

EXAMPLE 3

The procedure specified in Example 1 was modified solely in that a different treatment solution was caused to flow over the silvered glass prior to painting.

The treatment solution applied to the different mirrors was a precipitate-free and non-opalescent aqueous solution containing about 140 mg/L SnSO₄, acidified by adding sulphuric acid to a pH below 3.5.

A third Test Sample was manufactured at the same time, no treatment solution being used.

When subjected to the CASS Test, the results were as follows.

| Mirror | CASS test mean in μm | CASS test maximum in μm |
| --- | --- | --- |
| Test sample 3 | 3252 | 4319 |
| Example 3 | 159 | 230 |

The tin sulphate treatment affords highly effective protection to the silver layer as indicated by the CASS Test.

EXAMPLE 4

In a variant of Example 2, after the silver layer had been treated with non-opalescent stannous chloride solution, it was rinsed and dried. The treated silver layer was then sprayed with a solution containing 0.1% by volume gammaaminopropyl triethoxysilane (Silane A1100 from Union Carbide). After further rinsing and drying, the mirror was then painted with epoxy paint from Levis (compare Example 1), the first coat of paint being applied in an organic solvent (xylene), and the second coat being applied as an aqueous emulsion. The mirror thus obtained gave substantially the same results for the CASS and Salt Fog Tests as did the mirror of Example 2.

EXAMPLE 5

Mirrors were manufactured as described in Example 1 up to the stage of rinsing and drying the newly deposited reflective layer of silver. After such rinsing and drying, a thin copper film containing copper in an amount of approximately 300 mg/m² was deposited on top of the silver layer in a manner known per se so that the metal coating was constituted by the silver layer and the thin copper film. After rinsing and drying, the metal coating was treated using an acidified opalescence-free freshly made aqueous solution containing about 120 mg/L SnCl₂, and was then again rinsed and dried. The treated metal coating was then painted as described in Example 1. The mirror of Example 5 is thus equivalent to the mirror of Test Sample 2 but modified in that the metal coating comprising a silver layer and a thin overcoating copper film has been treated in accordance with this invention.

The mirror of Example 5 was subjected to the same tests as that of Example 1 and Test Sample 2 to give the following results:

| Mirror | CASS test mean in μm | Salt Fog Test mean in μm |
| --- | --- | --- |
| Example 5 | 108 | 26 |
| Example 1 | 99 | 58 |
| Test sample 2 | 134 | 51 |

Mirror tiles measuring 5 by 10 cm manufactured according to Examples 1 and 5 and Test Sample 2 were subjected to a further corrosion test in which they were immersed in a solution made up from equal parts of glacial acetic acid and dichloromethane, with a view to determining the time taken for the onset of visible corrosion at the margins of the mirrors.

The results obtained were as follows:

| Mirror | Onset of Visible Corrosion |
| --- | --- |
| Test sample 2 | 2 minutes 30 seconds |
| Example 1 | 4 minutes |
| Example 5 | 7 minutes |

EXAMPLE 6

A sheet of glass is placed in a chamber which is evacuated to a pressure of $2 \times 10^{-5}$ torr (2.6 mPa) and an opaque reflective coating of silver is deposited on the glass. As soon as the coating was formed, the sheet was cut into four sample tiles.

A first tile was immediately treated with a fresh, non-opalescent aqueous solution containing 114 mg/L $SnCl_2$ and acidified to a pH of between 1 and 3.5. It was successively rinsed with demineralized water and ethyl alcohol to accelerate drying by fluid flow and evaporation.

A second tile was also immediately treated to serve as a control sample. The treatment was the same save that instead of the tin (II) chloride solution, demineralized water was used.

Light reflecting and transmitting properties of the other two tiles were measured, and it was found that their total luminous transmission was 0.25% and their luminous reflection from the coated face was 92.84%.

The third and fourth tiles were respectively subjected to the same treatments as the first and second tiles, except that such treatments were carried out after an interval of one hour following coating.

The first and second tiles were placed side by side on a boat which was partly filled with a 20% solution of $(NH_4)_2S$, which was agitated to ensure uniform treatment, so that parts of the tiles were exposed, under a hood, for ten seconds to the action of the ammonium sulphide vapour. This is quite a severe corrosion resistance test, because the degradation of silver by sulphides is quite rapid. The third and fourth tiles were tested in a similar way, but were exposed to the ammonium sulphide vapour for 15 seconds.

The results of the tests are given in the following table.

| Sample | Treatment | Appearance Glass side | Appearance Coated side |
| --- | --- | --- | --- |
| Tile 1 | Immediate $SnCl_2$ | No change | No change |
| Tile 2 | Comparative Immediate $H_2O$ | Brownish aspect | Bluish diffusing aspect; greenish in oblique aspect no more specular reflection |
| Tile 3 | $SnCl_2$ after 1 hr | No change | Slight brownish aspect |
| Tile 4 | Comparative $H_2O$ after 1 hr | Brownish aspect diffusing | Strongly diffusing blue; green brown in reflection |

Luminous reflection from the coated faces of the four tiles was also measured. Tiles 1 and 3 according to the invention respectively exposed to ammonium sulphide for 10 and 15 seconds both still exhibited a very high degree of specular reflection. The actual reflectivities of the coated faces of these two tiles were respectively 86.91% and 78.16%. Tiles 2 and 4, on the other hand, only exhibited reflectivities of 30.82% and 31.63% respectively, and such reflection as was observed was in both cases highly diffusing: specular reflection was weak to non-existent.

EXAMPLE 7

Glass was coated, in a magnetron, with a 30 nm layer of ZnO and then a 30 nm layer of silver. To form the coatings, a sheet of glass was introduced into a processing chamber comprising two planar magnetron sources having targets respectively of zinc and silver, an entry and an outlet gas lock, a conveyor for the glass, power sources, sputtering gas inlets and an evacuation outlet. The sheet was transported past the sputtering sources with the zinc source activated and cold sputtered with oxygen gas to give the zinc oxide layer. The oxygen was then evacuated and the sheet moved back past the sputtering sources with the silver source activated but this time with argon as sputtering gas, in order to form the silver layer. The sheet was then removed and cut into tiles. Three of the tiles were then treated as soon as possible with fresh non-opalescent acidified aqueous solutions of tin (II) chloride as with Tile 1 of Example 6, three of the tiles were treated with water, as with Tile 2 of Example 6, and the seventh was untreated.

The tiles were exposed to ammonium sulphide as described in Example 6 for various periods, and their luminous reflectivities and transmissivities were measured. The results appear in the following table.

| $(NH_4)_2S$ exposure time | Type of treatment | Total luminous transmissivity | Total luminous reflectivity Coated side | Total luminous reflectivity Glass side |
| --- | --- | --- | --- | --- |
| None | None | 50,66% | 41,59% | 35,42% |
| 20 seconds | SnCl2 | 51,75 | 34,78 | 27,40 |
| | H2O | 45,24 | 23,97 | 14,59 |
| 30 seconds | SnCl2 | 51,17 | 31,02 | 22,24 |
| | H2O | 39,62 | 23,40 | 13,24 |
| 40 seconds | SnCl2 | 51,90 | 34,24 | 26,54 |
| | H2O | 40,84 | 22,73 | 9,80 |

The results show that the tin chloride treatment according to the invention affords a good degree of protection against deterioration of the optical properties of a silver layer which is subjected to an ammonium sulphide corrosion test.

EXAMPLES 8, 9 and 10

Example 1 was repeated using three different non-opalescent, aqueous treatment solutions. The solutions used were acidified by the addition of hydrochloric acid so that they had a pH of between 1 and 3.5, and their compositions were as follows:

| Example 8: | a solution containing 118 mg/L $SnCl_2$ |
| --- | --- |
| Example 9: | a solution containing about 100 mg/L $SnCl_2$ and 10 mg/L $TiCl_3$ |
| Example 10: | a solution containing 59 mg/L $SnCl_2$ and 48 mg/L $TiCl_3$ |

The three mirrors were then painted as specified in Example 2.

The results of the two ageing tests specified in Example 1 on these two mirrors were as follows.

| Mirror | CASS test mean in μm | Salt fog test mean in μm |
| --- | --- | --- |
| Example 8 | 137 | 35 |
| Example 9 | 140 | 32 |
| Example 10 | 153 | 37 |

These mirrors also have very good resistance to corrosion as measured by the CASS and Salt Fog Tests.

EXAMPLE 11

Sheets of soda-lime glass are advanced at a speed of 3.5 meters per minute along a classical mirror production line, where the glass is polished and sensitized in the usual way. The sheets of glass then pass through a silvering station where they are sprayed with a classical aqueous silvering solution to form a layer containing silver in an amount of approximately 1 000 mg/m$^2$.

Directly after rinsing of the silver layer, at ambient temperature, the advancing silvered sheets of glass are sprayed with an acidified, aqueous, precipitate-free and non-opalescent solution of stannous chloride. In a particular practical embodiment, a fresh solution containing about 40 g/L SnCl$_2$ is fed to a metering pump where that solution is diluted with demineralized water and fed to a bank of spray heads which deliver the diluted solution against the glass. The solution sprayed had a pH of between 1 and 3.5. After rinsing and drying, the mirrors are painted using a commercially available white paint from Bouvet.

The treatment was performed on a continuous production line for a period of four hours using the same batch of solution which was originally fresh and non-opalescent. It was noted that the solution used started to exhibit slight opalescence and turbidity after about three hours. It will therefore be apparent that the process performed in the last hour of the production run was not according to this invention.

Mirrors produced during the course of each hour of production were then subjected to the CASS and Salt Fog Tests specified in Example 1, and the results were as follows:

| Mirror | CASS test mean μm | CASS test max. μm | CASS test Pinholes/dm$^2$mean μm | Salt fog test max. μm |
| --- | --- | --- | --- | --- |
| Average first three hrs | 118 | 166 | 0 | 22 | 35 |
| Average last hr | Total destruction of reflection | | | 187 | 372 |

From this it will be apparent that the efficacy of attempts to confer protection against corrosion on a silver surface by treating it with an aqueous solution of stannous chloride will depend on that solution being fresh and free from opalescence and turbidity. It is essential to use a fresh solution.

We have found that in those silver layers which are protected against corrosion by a treatment with a fresh stannous salt solution, there is a distinct surface stratum of the silver which contains a population of tin atoms. The presence of those tin atoms, and their proportion in relation to the other metal (silver) atoms present may be ascertained by an X-ray bombardment technique which causes the ejection of electrons from a surface stratum of the silver. From the X-ray beam energy and the energy of the emitted electrons, it is possible to calculate the binding energy of the electrons so that they may be apportioned between specific electron shells of different atomic species. The atomic ratios of tin and silver may then readily be calculated. Such an analysis may be performed on a very thin surface stratum, for example one which is 2 to 3 nm in thickness. Such X-ray bombardment technique is performed on an exposed metal layer, so any paint applied is first stripped off, for example using methylene chloride.

When mirrors are tested in this way, typical values for an untreated mirror are about 0.2 to 0.5 atoms Sn % Ag, in the 2 to 3 nm surface layer. The tin population in subsurface strata of the reflective silver layer is no greater than that. Typical values for a mirror treated in accordance with this invention are 13 to 35 atoms Sn % Ag in a 2 to 3 nm thick surface stratum after the removal of an applied coating of paint, unless the mirror has also been treated with a silane prior to painting, in which case the tin population is typically 6 to 10 atoms Sn % Ag after the paint has been stripped away. This enhanced population of tin atoms is confined to a surface stratum a few nanometers thick.

EXAMPLE 12

Sheets of soda-lime glass are advanced along a classical mirror production line where the glass is cleaned and sensitized in the usual way. The glass sheets then pass through a silvering station where they are sprayed with a classical aqueous silvering solution to form a layer containing silver in an amount of approximately 1000 mg/m$^2$. After rinsing and drying of the silver layer, the glass is oriented vertically and an acidified aqueous solution containing about 600 mg SnCl$_2$ per liter is poured over it. The solution is freshly made and free from opalescence and it is acidified to bring its pH below 4. Two liters of this solution are used per square meter of glass treated. The treatment solution is applied to the coated substrate in such an amount that tin (II) atoms are applied to the coating in an amount of about 750 mg per square meter of coating.

Two comparative test mirrors were also manufactured on that production line. In both test mirrors, the stannous chloride treatment step was omitted. In one test mirror, a copper layer containing about 300 mg/m$^2$ was form on top of the silver layer, and in the other test mirror, no such additional layer was formed. The mirror of this Example and the two test mirrors were then painted with two coats of paint from Merckens.

These mirrors were then subjected to the tests specified in Example 1 to give the following results:

| Mirror | CASS test mean in μm | Salt fog test mean in μm |
| --- | --- | --- |
| Example 12 | 165 | 61 |
| Cu layer | 312 | 87 |
| No treatment or Cu | 5500 | 6625 |

In a variant of this Example, the treatment solution is applied to the coated substrate in such an amount that tin(II) atoms are applied to the coating in an amount of about 1500 mg per square meter of coating. This afforded a measure of protection to the silver layer, but the test results were not as good as those given by applying 750 mg tin(II) atoms per square meter.

EXAMPLE 13

Sheets of soda-lime glass are advanced along a classical mirror production line where the glass is cleaned and sensitized in the usual way. The glass sheets then pass through a silvering station where they are sprayed with a classical aqueous silvering solution to form a layer containing silver in an amount of approximately 900 mg/m$^2$. After rinsing and drying of the silver layer, the glass is oriented vertically and an acidified aqueous solution containing a a stannous salt is poured over it. In fact two different solutions are used for treating different sheets. A first solution contains 12 mg/L SnCl$_2$ and a second solution contains 13.5 mg/L SnSO$_4$. Each solution is freshly made and free from opalescence and it is acidified, respectively using hydrochloric and sulphuric acids, to bring its pH below 4. 1.8 liters of each solution are used per square meter of glass treated. The treatment solutions are thus applied to the coated substrate in such an amount that tin (II) atoms are applied to the coating in an amount of about 13.5 mg per square meter of coating.

A comparative mirror is left untreated.

The two mirrors of this Example and the comparative mirror are painted with two coats of paint from Merckens.

These mirrors were then subjected to the tests specified in Example 1 to give the following results:

| Mirror | CASS test mean in μm | Salt fog test mean in μm |
|---|---|---|
| SnSO$_4$ | 175 | 41 |
| SnCl$_2$ | 231 | 46 |
| No treatment | 5000 | 380 |

In a variant of this Example, the treatment solution is applied to the coated substrate in such an amount that tin(II) atoms are applied to the coating in an amount of about 1.6 mg per square meter of coating. This afforded a measure of protection to the silver layer, but the test results were not as good as those given by applying 13.5 mg tin(II) atoms per square meter.

What is claimed is:

1. A reflective article, comprising:
   a glass substrate; and
   a reflective metal coating deposited on the glass substrate comprising a reflective layer of silver and having a surface stratum which has a population of tin atoms which is augmented as compared with the population of tin atoms (if any) in an underlying subsurface stratum by at least one tin atom per hundred metal atoms thereby conferring on the reflective metal coating an enhanced resistance to corrosion.

2. The reflective article according to claim 1, wherein the reflective metal coating is constituted by said reflective layer of silver.

3. The reflective article according to claim 1, wherein the reflective metal coating is constituted by said reflective layer of silver and a thin overcoating film of copper.

4. The reflective article according to claim 1, wherein the glass substrate is a glass sheet and wherein the reflective layer of silver is in the form of a transparent coating applied to the glass sheet which is held in spaced relation from at least one other glass sheet to form a hollow glazing unit, the reflective layer of silver being located inside the glazing unit.

5. The reflective article according to claim 1, wherein the reflective layer of silver is contained within a vacuum deposited layer.

6. The reflective article according to claim 1, wherein the surface stratum also contains a population of titanium atoms.

7. The reflective article according to claim 1, wherein the surface stratum has a population of tin atoms which is augmented as compared with the population of tin atoms (if any) in an underlying subsurface stratum by at least five tin atoms per hundred metal atoms.

8. The reflective article according to claim 1, wherein the reflective article is constituted as a mirror.

9. The reflective article according to claim 8, wherein the reflective metal coating is overcoated with at least one protective layer of paint.

10. The reflective article according to claim 9, wherein the at least one protective layer of paint is applied to the reflective metal coating after the latter is treated with a silane.

11. The reflective article according to claim 9, wherein the at least one protective layer of paint is substantially lead-free.

12. A reflective article, comprising:
    a glass substrate; and
    a reflective metal coating deposited on the glass substrate, wherein the reflective metal coating comprises a reflective layer of silver and has been treated with an acidified aqueous solution of a stannous salt, which solution is free from opalescence, thereby to augment tin atom population in a surface stratum of the reflective metal coating.

13. The reflective article according to claim 12, wherein the reflective metal coating has a surface stratum having a population of tin atoms which is augmented as compared with the population of tin atoms (if any) in an underlying subsurface stratum by at least one tin atom per hundred metal atoms.

* * * * *